United States Patent
Heaman et al.

(10) Patent No.: US 7,712,811 B2
(45) Date of Patent: May 11, 2010

(54) INTEGRATED RATCHETING TAILGATE EXTENDER

(75) Inventors: Dan P. Heaman, South Lyon, MI (US); Craig Sandvig, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/113,652

(22) Filed: May 1, 2008

(65) Prior Publication Data
US 2009/0273202 A1 Nov. 5, 2009

(51) Int. Cl.
*B60P 3/34* (2006.01)
(52) U.S. Cl. .................. 296/26.08; 296/62
(58) Field of Classification Search .......... 296/26.06, 296/37.6, 26.09, 57.1, 26.11, 62, 26.1, 50
See application file for complete search history.

(56) References Cited

U.S. PATENT DOCUMENTS

| 5,205,603 | A | * | 4/1993 | Burdette, Jr. ............... 296/62 |
| 5,549,312 | A | * | 8/1996 | Garvert ..................... 296/62 |
| 5,788,311 | A | * | 8/1998 | Tibbals ...................... 296/62 |
| 6,270,139 | B1 | | 8/2001 | Simpson ..................... 296/62 |
| 6,364,391 | B1 | * | 4/2002 | Everett ..................... 296/57.1 |
| 6,364,392 | B1 | | 4/2002 | Meinke |
| 6,454,338 | B1 | | 9/2002 | Glickman et al. |
| 6,698,810 | B1 | | 3/2004 | Lane |
| 6,932,404 | B2 | | 8/2005 | Vejnar |
| 6,964,444 | B2 | * | 11/2005 | Chumley et al. .......... 296/26.08 |
| 6,988,756 | B1 | * | 1/2006 | Meinke et al. ............ 296/26.08 |
| 6,991,277 | B1 | | 1/2006 | Esler |
| 6,994,363 | B2 | | 2/2006 | Seksaria et al. |
| 7,070,222 | B2 | | 7/2006 | Bruford et al. |
| 7,090,276 | B1 | * | 8/2006 | Bruford et al. ............. 296/62 |
| 7,213,859 | B1 | * | 5/2007 | Tan et al. .................. 296/26.09 |
| 7,401,833 | B2 | * | 7/2008 | Dryja ....................... 296/62 |
| 7,530,619 | B1 | * | 5/2009 | Bruford et al. ............ 296/26.1 |
| 7,549,692 | B2 | * | 6/2009 | Washington ................ 296/61 |
| 2002/0070577 | A1 | * | 6/2002 | Pool et al. ................. 296/62 |
| 2002/0109367 | A1 | | 8/2002 | Terrusa |

\* cited by examiner

*Primary Examiner*—Kiran B. Patel
(74) *Attorney, Agent, or Firm*—Gregory Brown; Price, Heneveld, Cooper, DeWitt & Litton, LLP

(57) ABSTRACT

A vehicle tailgate extender mechanism including a tailgate frame having a tailgate bed extender guide, and a bed extender assembly coupled to the tailgate frame and including an extender cross member. An extender guide may be secured to the extender cross member, and an extender support member may be secured to the extender cross member. The extender support member is capable of at least partial insertion into and extraction out of the tailgate bed extender guide. A cargo restraining panel is rotatably coupled to the extender cross member. A ratcheting mechanism may couple the extender support member to the tailgate frame and allow the extender support member to be linearly displaced in a first direction within the tailgate bed extender guide while simultaneously preventing substantial linear movement of the extender support member in a second direction opposite the first direction within the tailgate bed extender guide.

8 Claims, 5 Drawing Sheets

INTEGRATED RATCHETING TAILGATE EXTENDER

BACKGROUND OF INVENTION a. Field of Invention

The invention relates generally to tailgate extenders for pick-up trucks, sport utility vehicles ("SUVs") and other such vehicles, and more particularly, to a tailgate extender assembly for securing oversized cargo that may extend beyond the cargo storage area of a vehicle, while additionally providing a retractable step assembly for facilitating access to the cargo storage area of the vehicle.

b. Description of Related Art

As is known in the art, pick up trucks, SUVs and other such vehicles are valued for the ability to transport a wide variety of materials. Such vehicles generally include a tailgate that both allows access to the vehicle's cargo bed and acts as a barrier for restraining transported materials within the cargo bed during vehicle operation. The tailgate typically pivots from a generally vertical closed position to a generally horizontal open position that allows for loading and unloading of material respectively to or from the vehicle's cargo bed. Frequently, materials must be transported that do not fit within the vehicle's standard cargo space when the tailgate is in the closed position. The vehicle's user must therefore transport the materials with the tailgate in an open horizontal position or with the materials extending beyond the upper edge of a closed tailgate. In both cases, the materials must be manually secured to one or more structural elements on the vehicle to restrain the materials. The securing process can be time consuming and prone to failure, potentially resulting in materials falling out of the vehicle's cargo bed, thus damaging the materials or other vehicles.

In an effort to address the aforementioned drawbacks of conventional tailgates, several mechanisms have been developed for extending the cargo bed of a vehicle. Known bed extender designs which mount to the exterior of a tailgate can reduce the amount of available storage space within the cargo bed, because the bed extender is stored within the cargo bed when not in use. Additionally, since externally mounted bed extenders are visible even when not in use, such extenders can detract from the overall styling and attractiveness of a vehicle. Other types of bed extenders, such as the extender disclosed in U.S. Pat. No. 6,932,404 to Vejnar, overcome the problems associated with externally mounted extenders by allowing the bed extender to be stored within and deployed out of the body of the tailgate itself. As these bed extenders typically extend horizontally from the open tailgate frame, they can make entry or egress from the vehicle bed even more difficult due to the overall operational characteristics of the extender.

Yet further, as shown in FIG. 13 of Vejnar, the Vejnar internally stored bed extender provides a vertical surface for restraining the transported materials within the extended cargo bed when the bed extender is in use. Specifically, Vejnar discloses a tailgate (3) with slidable back panel (5) and a retractable stop (21) secured a fixed distance from the back panel's pivot axis. While the retractable stop assists in preventing transported materials from sliding out of the cargo bed during operation of the vehicle, particularly during vehicle acceleration, the materials can still move and shift within the cargo bed. The fixed retractable stop creates a space that is often longer than necessary to accommodate the oversized materials and thus permits the stored materials to shift during vehicle operation, potentially damaging both the transported materials and the structural panels within the truck bed. Therefore, manually securing the materials within the cargo bed is still necessary.

As discussed above, a further disadvantage of conventional tailgate bed extenders is the difficulty of entering and exiting the cargo bed of the vehicle with the bed extender in use. Frequently, the deployed bed extender physically prevents access to the cargo bed. Consequently, users must climb over the side walls of the cargo bed using the vehicle's rear tires as a boosting step to enter the cargo area. This process can be inconvenient, as the side wall exteriors of the vehicle can be covered in mud or other debris that can soil clothes. In an effort to overcome the problems associated with boarding, several types of bed extenders have been developed that can be converted to a step for assisting the user in entering the cargo area. However, the assembly that is used as the step is also used as the bed extender and thus the mechanism must be used as either a step or a bed extender, but not both simultaneously.

It is therefore desirable to provide a bed extender that retracts into the tailgate frame when not in use, and that securely and safely restrains materials within the cargo bed without the need for manually securing the objects to prevent sliding in the bed area. It is further desirable to provide a means for easily entering and exiting the cargo bed of a vehicle when the bed extender is either in the extended or retracted position.

SUMMARY OF THE INVENTION

The invention solves the problems and overcomes the drawbacks and deficiencies of prior art bed extender devices by providing a vehicle tailgate extender mechanism including a tailgate frame having an interior cavity and one or more tailgate bed extender guides. A bed extender assembly may be coupled to the tailgate frame and include one or more extender cross members, one or more extender guides secured to the extender cross member, and one or more extender support members secured to the extender cross member. The extender support member may be capable of at least partially extending out of and retracting into the tailgate bed extender guide. A mounting assist arm may be rotatably coupled to the extender cross member. A step assembly may be coupled to the bed extender assembly and include one or more step cross members secured to one or more step support members capable of at least partially retracting into and extending out of the extender guide. The step support member may also be capable of pivoting about a hinge adjacent a distal end of the extender guide when the step support member is in a substantially extended position. A cargo restraining panel may be rotatably coupled to the extender cross member. A ratcheting mechanism may couple the extender support member to the tailgate frame and allow the extender support member to be linearly displaced in a first direction within the tailgate bed extender guide while simultaneously preventing substantial linear movement of the extender support member in a second direction opposite the first direction within the tailgate bed extender guide.

For the vehicle tailgate extender mechanism described above, the ratcheting mechanism may include a linear pawl engageable with a surface of a ratchet tooth. The ratchet tooth may be integrated into an engagement rack coupled to the tailgate frame. The ratcheting mechanism may include a release mechanism that at least partially retracts the linear pawl into an interior of the extender support member when the release mechanism is engaged. The release mechanism may be engaged by pivoting a release latch disposed on the extender cross member.

The invention also provides a vehicle tailgate extender mechanism including a tailgate frame having one or more tailgate bed extender guides. A bed extender assembly may be coupled to the tailgate frame and include one or more extender cross members, one or more extender guides secured to the extender cross member, and one or more extender support members secured to the extender cross member. The extender support member may be capable of at least partially extending out of and retracting into the tailgate bed extender guide. A step assembly may be coupled to the bed extender assembly and include one or more step cross members secured to one or more step support members capable of at least partially retracting into and extending out of the extender guide. The step support members may also be capable of pivoting about a hinge adjacent a distal end of the extender guide when the step support member is in a substantially extended position.

For the vehicle tailgate extender mechanism described above, the mechanism may further include a mounting assist arm rotatably coupled to the extender cross member. The extender support member may be of a rectangular cross-sectional shape. The mechanism may further include a cargo restraining panel rotatably coupled to the extender cross member. A ratcheting mechanism may couple the extender support member to the tailgate frame and allow the extender support member to be linearly displaced in a first direction within the tailgate bed extender guide while simultaneously preventing substantial linear movement of the extender support member in a second direction opposite the first direction within the tailgate bed extender guide. The ratcheting mechanism may include a linear pawl engageable with a surface of a ratchet tooth, with the ratchet tooth being integrated into an engagement rack coupled to the tailgate frame. The ratcheting mechanism may include a release mechanism that at least partially retracts the linear pawl into an interior of the extender support member when the release mechanism is engaged. The release mechanism may be engaged by pivoting a release latch disposed on the extender cross member.

The invention yet further provides a vehicle tailgate extender mechanism including a tailgate frame including one or more tailgate bed extender guides. A bed extender assembly may be coupled to the tailgate frame and include one or more extender cross members, one or more extender guides secured to the extender cross member, and one or more extender support members secured to the extender cross member. The extender support member may be capable of at least partial insertion into and extraction out of the tailgate bed extender guide. A cargo restraining panel may be rotatably coupled to the extender cross member. A ratcheting mechanism may couple the extender support member to the tailgate frame and allow the extender support member to be linearly displaced in a first direction within the tailgate bed extender guide while simultaneously preventing substantial linear movement of the extender support member in a second direction opposite the first direction within the tailgate bed extender guide.

For the vehicle tailgate extender mechanism described above, the extender support member may include a rectangular cross-sectional shape. The ratcheting mechanism may include a linear pawl engageable with a surface of a ratchet tooth, with the ratchet tooth being integrated into an engagement rack coupled to the tailgate frame. The ratcheting mechanism may include a release mechanism that at least partially retracts the linear pawl into an interior of the extender support member when the release mechanism is engaged. The release mechanism may be engaged by pivoting a release latch disposed on the extender cross member.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF PREFERRED EMBODIMENTS

Figure 1:
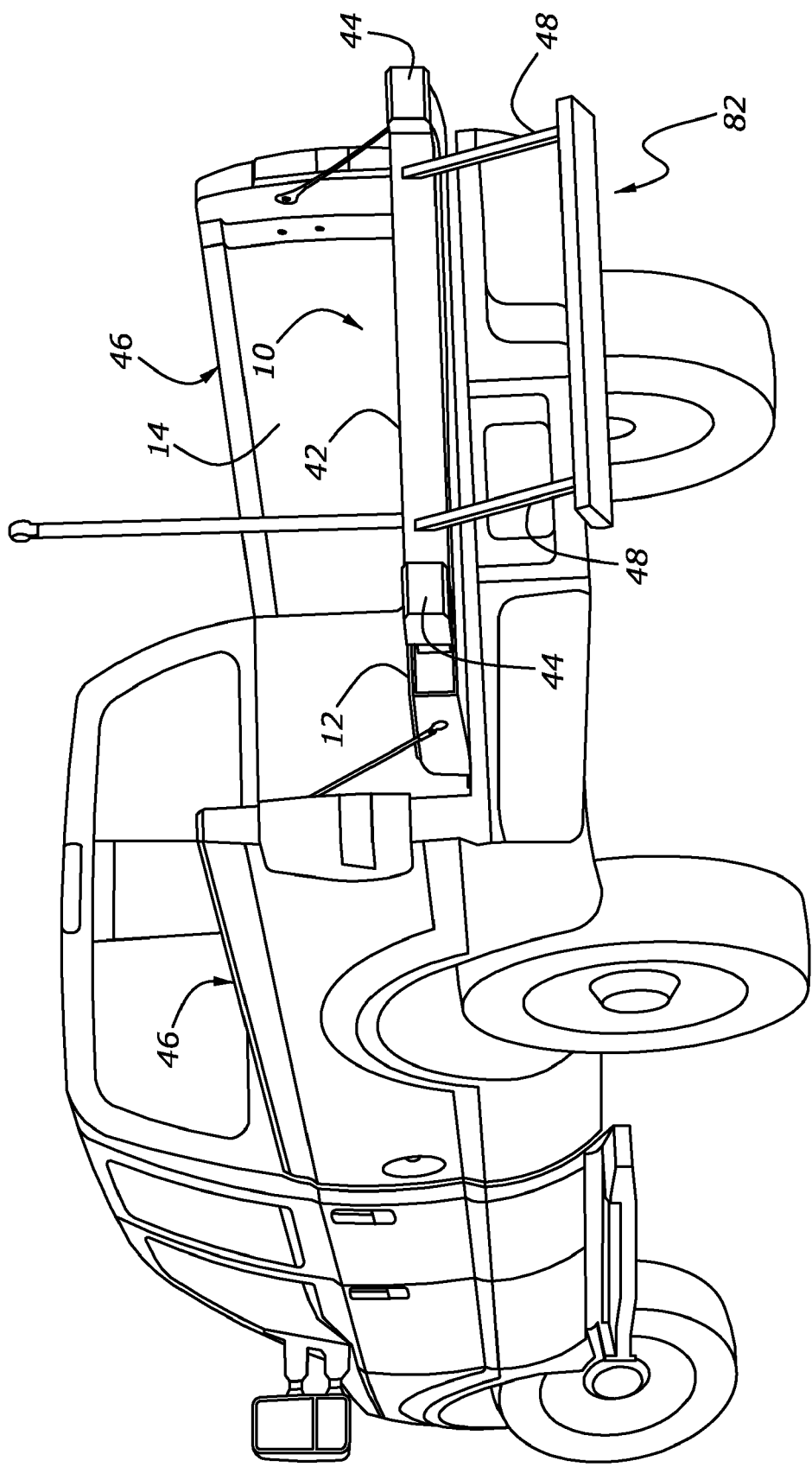
FIG. 1 is an isometric view of a pick-up truck with the tailgate in an open horizontal position, a tailgate and bed extender, and a step assist for a vehicle tailgate extender mechanism according to the present invention deployed, and a mounting assist arm in an upright position.
Figure 2:
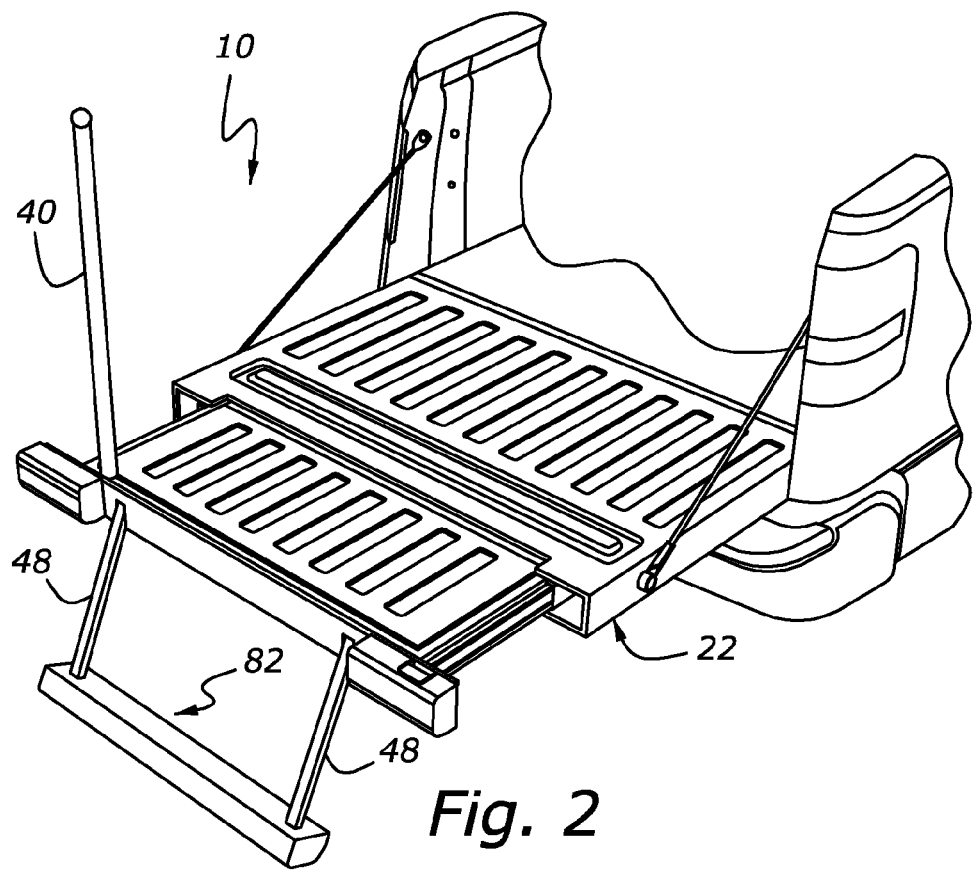
FIG. 2 is a partial perspective view of the pick-up truck of FIG. 1, illustrating the tailgate and bed extender, and step assist of FIG. 1 deployed and the mounting assist arm in the upright position.
Figure 3:
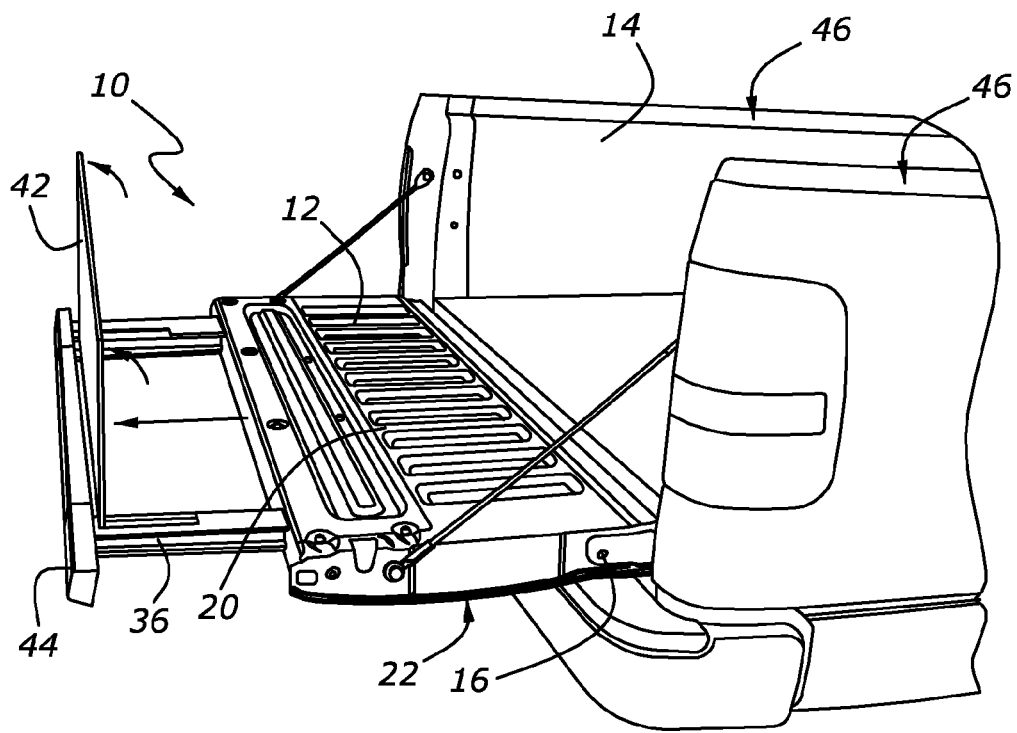
FIG. 3 is a partial isometric view of the pick-up truck of FIG. 1, illustrating the tailgate and bed extender, and step assist of FIG. 1 deployed and the mounting assist arm in the upright position.

Referring now to the drawings wherein like reference numerals designate corresponding parts throughout the several views, FIGS. 1-8 illustrate various views of a vehicle tailgate extender mechanism according to the present invention, the mechanism being hereinafter generally designated "vehicle tailgate extender mechanism 10."

Referring to FIGS. 1-8, vehicle tailgate extender mechanism 10 may generally include a tailgate frame 12 pivotally mounted to a vehicle side wall 14 at pivot point 16. The tailgate frame may include an interior cavity 18 formed between an inner tailgate panel 20 and an outer tailgate panel 22. Interior cavity 18 may include one or more tailgate guides secured to the tailgate frame by using methods commonly known in the art, such as welding or mechanical fastening, including screwing or riveting. Referring to FIGS. 4-7, in one embodiment, a first tailgate guide 24 having a substantially rectangular cross section may be disposed generally parallel to a first tailgate side panel 26, and a second tailgate guide 28

(not shown) having a substantially rectangular cross section may be disposed generally parallel to a second tailgate side panel 30. As readily evident, the cross-sectional shape of tailgate guides 24, 28 may be formed in a square, circle, oval, C-shape, or some variant thereof.

Referring again to FIGS. 1-8, vehicle tailgate extender mechanism 10 may generally include a bed extender assembly 32 coupled to tailgate frame 12. The bed extender assembly may include one or more extender cross members 34, extender support members 36, extender guides 38, mounting assist arm 40 and cargo restraining panel 42, each coupled to the extender cross members.

In one embodiment, extender cross member 34 may be a generally planar bar that acts as a support element for bed extender assembly 32. In other embodiments, the extender cross member may be a tube having a rectangular or circular cross-sectional shape. The extender cross member may also have an irregular cross-sectional shape, or contain cutouts or surface contours without departing from the scope of the invention. One skilled in the art would readily appreciate in view of this disclosure that additional extender cross members may be disposed between the extender support members 36 to provide necessary structural support for the bed extender assembly.

In one embodiment, extender molding 44 may be secured to a surface of extender cross member 34 such that the extender molding may be visible when bed extender assembly 32 is retracted. In this embodiment, extender molding 44 may be designed to maintain visual continuity with the vehicle sidewall molding 46 (see FIG. 1) when the bed extender assembly is retraced and tailgate frame 12 is in a vertical closed position. Extender molding 44 may be fabricated from any number of materials common in the art, such as thermoformed plastic, injection molded plastic, or formed metal.

As briefly discussed above, one or more extender support members 36 may be coupled to extender cross member 34. In one embodiment, extender support member 36 may be generally rectangular in cross sectional shape and may be dimensioned to be telescopically received into tailgate guide 24. In this embodiment, the extender support member may be secured to the extender cross member through the use of one or more L-shaped extender mounting brackets (not shown), wherein the extender mounting bracket may be first mechanically fastened to the extender support member, and then mechanically fastened to the extender cross member.

Coupled to extender support member 36 may be a friction reduction mechanism (not shown), that allows an extender support member to be inserted into and extended out of tailgate guides 24, 28 with a minimal amount of force exerted by the user. In one embodiment, the friction reduction mechanism may include one or more rollers (not shown) each having a mounting bracket secured to an interior surface of a tailgate guide (i.e. guides 24, 28) such that an exterior surface of an extender support member 36 may be supported by a roller, and the roller allows for the linear movement of the extender support member relative to the tailgate guide.

Extender support member 36 may also employ an overextension stop mechanism (not shown) to prevent the extender support member from being removed from the interior of the corresponding tailgate guide. Although the overextension stop mechanism may be any of several commonly used in the art, one embodiment may include forming an external protrusion near the inserted end of the extender support member that engages an internal guard protrusion disposed near the distal end of the tailgate guide. When the extender support member is extended a predetermined distance from the tailgate guide, the external protrusion of the extender support member may be physically prevented from further linear displacement by contact with the internal guard protrusion of the tailgate guide.

Figure 6:
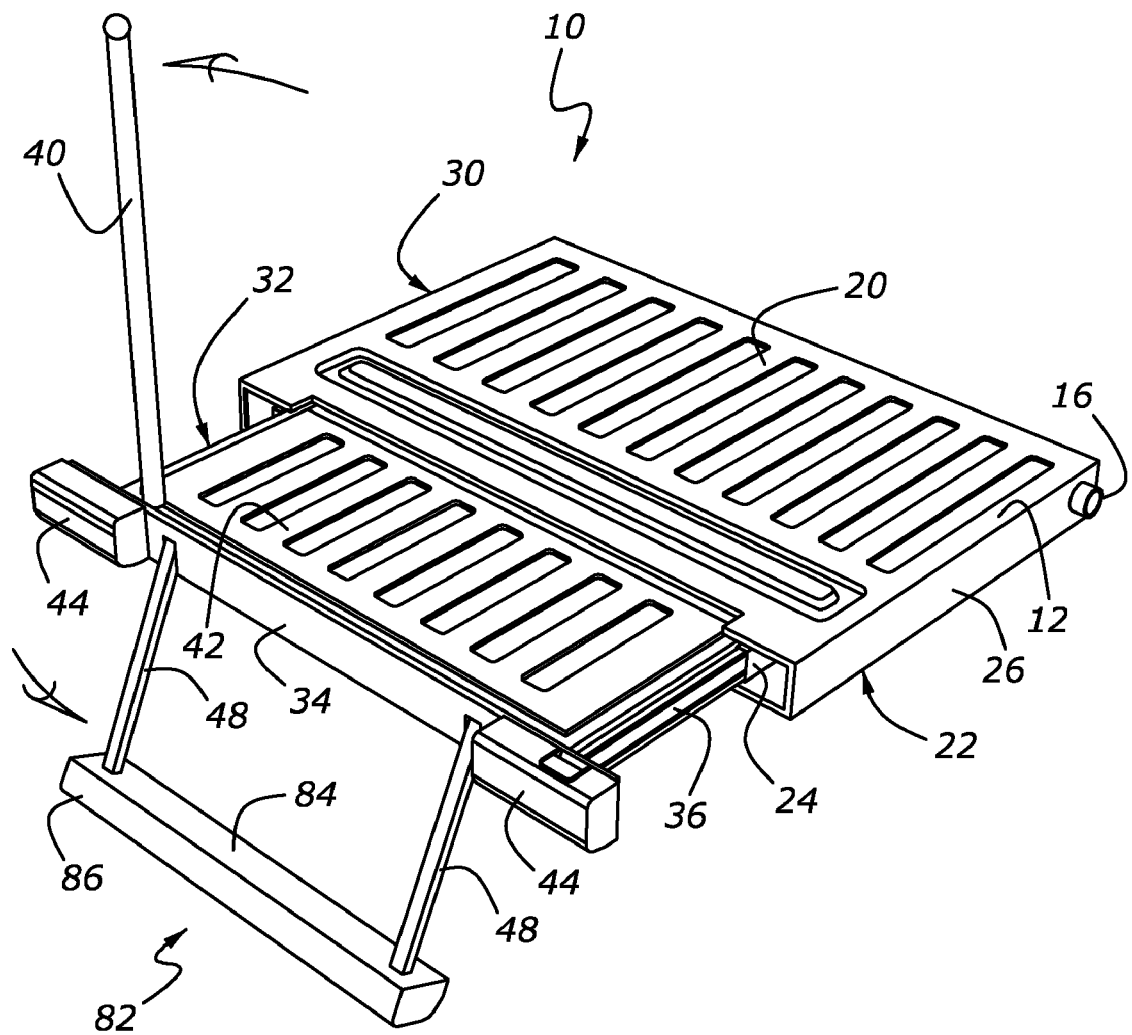
FIG. 6 is an isometric view of the tailgate and bed extender of FIG. 1, illustrating a mounting assist arm and the step assist disposed in a deployed configuration.

Referring to FIG. 6, extender guide 38 may be secured to extender cross member 34 in a position that may be substantially parallel to the position of extender support member 36 using, for example, welding or mechanical fastening. In one embodiment, an extender guide may be rectangular in cross-sectional shape and may be dimensioned to telescopically receive the distal end of a step support member 48 through a slot disposed on the extender cross member. Additionally, the cross-sectional shape of the extender guide may take the shape of a square, circle, oval, C-shape, or some variant thereof. In one embodiment, an extender guide may also be provided with additional structural support by one or more alignment brackets (not shown) mounted to the interior of inner tailgate panel 20. As bed extender assembly 32 may be retracted into horizontal tailgate frame 12 or deployed from the horizontal tailgate frame, the alignment brackets may prevent both vertical movement and lateral horizontal movement of the extender guide.

Figure 7:
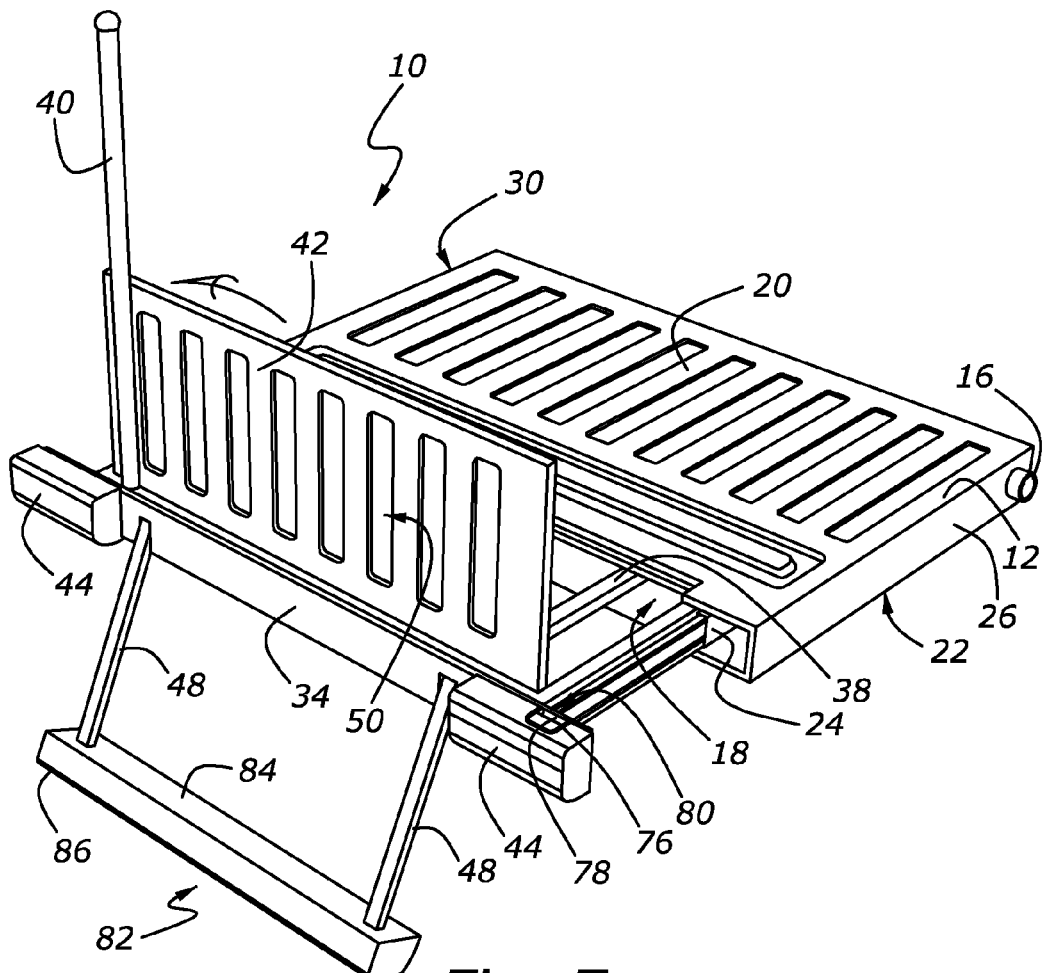
FIG. 7 is an isometric view of the tailgate and bed extender of FIG. 1, illustrating a mounting assist arm, the step assembly and a cargo restraining panel disposed in a deployed configuration.

As shown in FIG. 7, also coupled to extender cross member 34 may be cargo restraining panel 42. In one embodiment, the cargo restraining panel may be rectangular in shape with a plurality of contoured grooves 50 disposed on the planar surface for added structural support. The cargo restraining panel may also be pivotally mounted to extender cross member 34. More specifically, a pivoting mechanism (not shown) may be directly secured to the extender cross member using any of several commonly used fastening techniques, such as welding, mechanical fastening, snap fitting or adhesive bonding. The cargo restraining panel may rotate from the generally horizontal position shown in FIGS. 5 and 6 to the generally vertical position shown in FIG. 7. When the cargo restraining panel is moved from the generally horizontal position to the generally vertical position, a locking mechanism (not shown) may be used to lock the cargo restraining panel in the fully upright generally vertical position as shown in FIG. 7.

As also shown in FIG. 7, also secured to extender cross member 34 may be the mounting assist arm 40. In one embodiment, the mounting assist arm may be circular in cross-sectional shape having a proximal and distal end and a length less than the overall length of the extender cross member. A hinge (not shown) commonly known in the art may be mounted to the extender cross member that allows the mounting assist arm to rotate about a point near the proximal end from a generally horizontal closed position shown in FIGS. 4 and 5, to a generally vertical position shown in FIGS. 6 and 7 that may be substantially perpendicular to the surface of inner tailgate panel 20. In this fully upright vertical position, a locking mechanism (not shown) locks the mounting assist arm in place. A separate locking mechanism coupled to extender cross member 34 may secure the mounting assist arm in the generally horizontal position when the mounting assist arm is not in use. In one embodiment, a handle may be attached to the distal end of the mounting assist arm to allow a user to maintain a strong grip on the mounting assist arm when boarding the cargo area.

Figure 8:
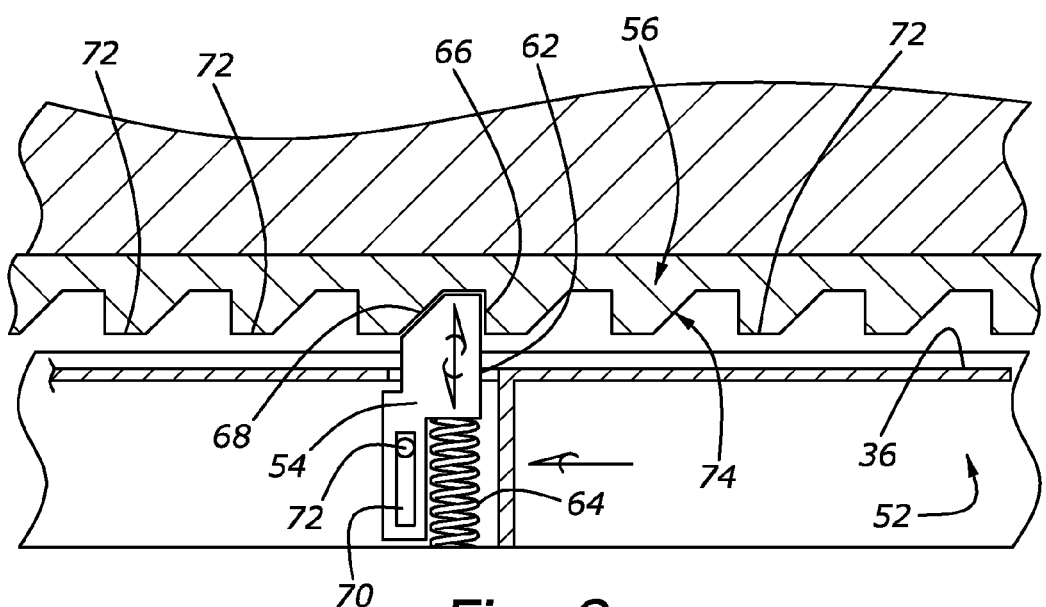
FIG. 8 is a sectional view of the tailgate and bed extender of FIG. 1, illustrating a ratcheting mechanism used to adjust the position of the tailgate and bed extender.

Referring to FIG. 8, vehicle tailgate extender mechanism 10 may additionally include a ratcheting mechanism 52 that couples extender support member 36 to a structural element mounted within the interior cavity of tailgate frame 12. The ratcheting mechanism may generally include a linear pawl 54 partially housed within extender support member 36, one or more engagement racks 56 in contact with the linear pawl when the linear pawl is not retracted, and a release mechanism (not shown) that causes the linear pawl to retract into the extender support member.

Linear pawl 54 may be partially disposed within the interior of extender support member 36 such that the engagement surfaces of the linear pawl extend out of the exterior of extender support member 36 through an engagement slot 62 on the extender support member when the linear pawl is not in the retracted position. The linear pawl may be generally maintained in the non-retracted position by a pawl spring 64 mounted to a surface within extender support member 36 and positioned in such a way that the spring tension acts to bias at least a portion of the linear pawl through the engagement slot and into contact with engagement rack 56. A primary engagement surface 66 of the linear pawl may be maintained in a position parallel to the linear motion of linear pawl 54 and perpendicular to the linear motion of extender support member 36. A secondary engagement surface 68 of the protruding end of the linear pawl may be disposed at an acute angle relative to the primary engagement surface. Pawl guide slots 70 may engage with pins 72 secured to the interior of the extender support member to limit the linear pawl's motion in a direction perpendicular to that of the extender support member.

Linear pawl 54 may be coupled to tailgate frame 12 by acting upon engagement rack 56 secured to the interior cavity of the tailgate frame. The engagement rack may include a plurality of ratchet teeth 73 integrally formed with engagement rack 56. Each engagement tooth may be shaped to allow the primary and secondary engagement surfaces of linear pawl 54 to substantially fit within the spaces between the engagement teeth. When the extender support member 36 is displaced in a first linear direction, the primary engagement surface of the linear pawl may mate with a substantially parallel surface on ratchet tooth 73, preventing further substantial linear displacement in the first direction. However, if extender support member 36 is displaced in a second direction opposite to the first direction, the angled secondary engagement surface contacts a substantially parallel angled ratchet tooth surface 74. This contact results in a force component in the direction perpendicular to the linear displacement that exceeds the tension force of the spring, resulting in the retraction of linear pawl 54 through the engagement slot, and thus there may be no significant resistance to linear displacement in the second direction.

As shown in FIG. 7, a release mechanism 76 may also couple a release latch 78 and linear pawl 54. In one embodiment, release latch 78 may be pivotally disposed within a release latch housing 80, with the housing being secured to the extender molding. The release latch may be coupled to linear pawl 54 by means of a mechanical linkage (not shown) commonly used in the art, the linkage being contained within the interior of the extender molding, passing through one or more openings on the extender cross member 34, and continuing into the interior of the extender support member 36. The mechanical linkage may translate the pivotal displacement of the release latch relative to the release latch housing into a linear displacement of a retraction pin disposed within the guide slot of linear pawl 54. As the linkage translates the retraction pin away from the engagement slot, the retraction pin may engage the bottom surface of the guide slot and cause the linear pawl to at least partially retract into the engagement slot and, in the process, disengage contact with the engagement rack.

Referring to FIGS. 2 and 4-8, a step assembly 82 may be slidably and rotatably coupled to the bed extender assembly 32. The step assembly may generally include one or more step cross members 84, one or more step support members 48, and step molding 86 secured to the step cross member.

In one embodiment, step cross member 84 may be a generally rectangular extruded tube that acts as a support element for the step assembly. In other embodiments, the extender cross member may be a planar bar or a tube having a circular cross sectional shape. The step cross member may also have an irregular cross-sectional shape, or contain cutouts or surface contours. Additional step cross members may be disposed between step support members 48 to provide necessary structural support for the step assembly.

As discussed above and shown in FIG. 7, coupled to step cross member 84 may be one or more step support members 48. In one embodiment, extender support member 36 may be generally rectangular in cross sectional shape and may be dimensioned to be telescopically received into the tailgate guide. Step support member 48 may be secured to the step cross member through use of an L-shaped step mounting bracket (not shown), wherein the step mounting bracket may be first mechanically fastened to the step support member, and then later welded to the step cross member. However, other commonly used fastening means, such as welding, snap fitting, or adhesive bonding, may also be used to secure the step support member to the step mounting bracket, the step cross member to the step mounting bracket, or the step support member directly to the step cross member.

Coupled to the step support member 48 may be a Fiction reduction mechanism (not shown), that allows the step support member to be inserted into and retracted out of extender guide 38 with a minimal amount of force exerted by the user. In one embodiment, the friction reduction mechanism may include one or more rollers (not shown) each having a mounting bracket secured to an interior surface of the extender guide such that an exterior surface of the step support member may be supported by a roller and the roller allows for the liner movement of the step support member relative to the extender guide.

Step support member 48 may also use an overextension stop mechanism (not shown) to prevent the step support member from being removed from the interior of the corresponding extender guide 38. In one embodiment, the overextension stop mechanism consists of a hinge pin disposed near the inserted end of the step support member that engages a slot near the distal end of the extender guide. As the step support member may be extended a predetermined distance relative to the extender guide, the hinge pin may be captured by the slot and the step support member, and consequently the step assembly rotates about the hinge pin in a direction towards the ground. After a predetermined rotational displacement, an exterior surface of the step support member comes in contact with a surface on the extender cross member and further rotational displacement may be prevented, resulting in the step assembly positioned substantially as illustrated in FIGS. 6-7.

Step molding 86 may also be coupled to step cross member 84. In one embodiment, the step molding may be secured to a surface of the step cross member such that the step molding may be visible when the step assembly and the bed extender assembly are both retracted. In this embodiment, the step molding may be designed to maintain visual continuity with the vehicle's sidewall molding when the bed extender assembly and the step assembly are retraced and the tailgate frame is in the vertical closed position. The step molding may be secured to the step cross member by mechanical fastening, however other commonly used fastening means, such as welding, snap fitting, or adhesive bonding, or any combination thereof may also be used.

The operation of vehicle tailgate extender mechanism 10 will now be described in detail with reference to FIGS. 4-8.

Specifically, with tailgate frame 12 disposed in its fully upright and closed position, a user may unlatch the tailgate frame and allow the tailgate to rotate to the open horizontal position shown in FIGS. 4-7. To deploy bed extender assembly 32, the user may pivotally displace release latch 78 secured to extender molding 44. The mechanical linkage of the release mechanism transfers the rotational motion of the release latch into linear motion of the retraction pin that retracts linear pawl 54 into engagement slot 62 of extender support member 36. Thus, while the release latch is rotated, the bed extender assembly may be extended towards the user up to the point that the mechanical stop may be engaged preventing further linear displacement.

Figure 4:
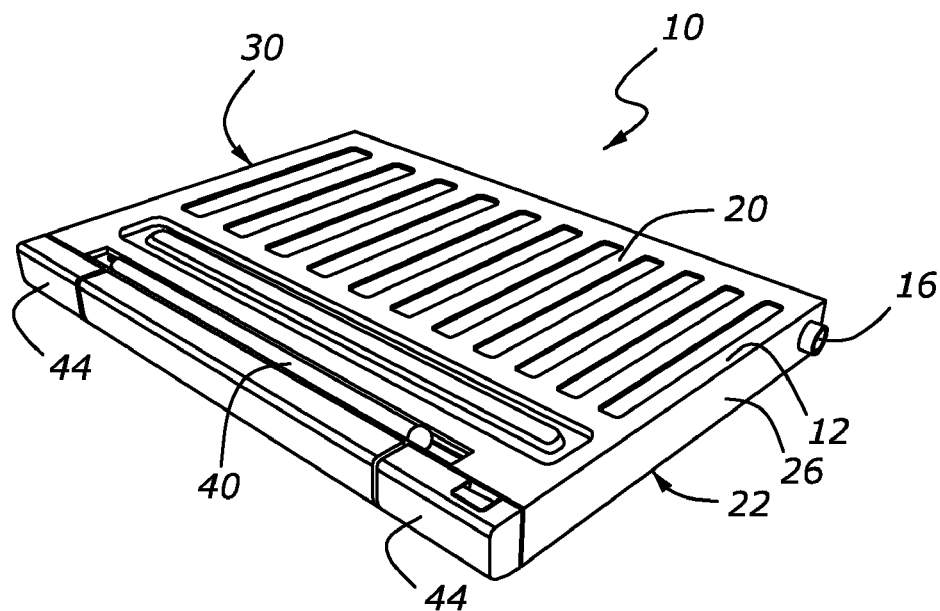
FIG. 4 is an isometric view of the tailgate and bed extender of FIG. 1, illustrating a step assembly disposed in a retracted configuration.
Figure 5:
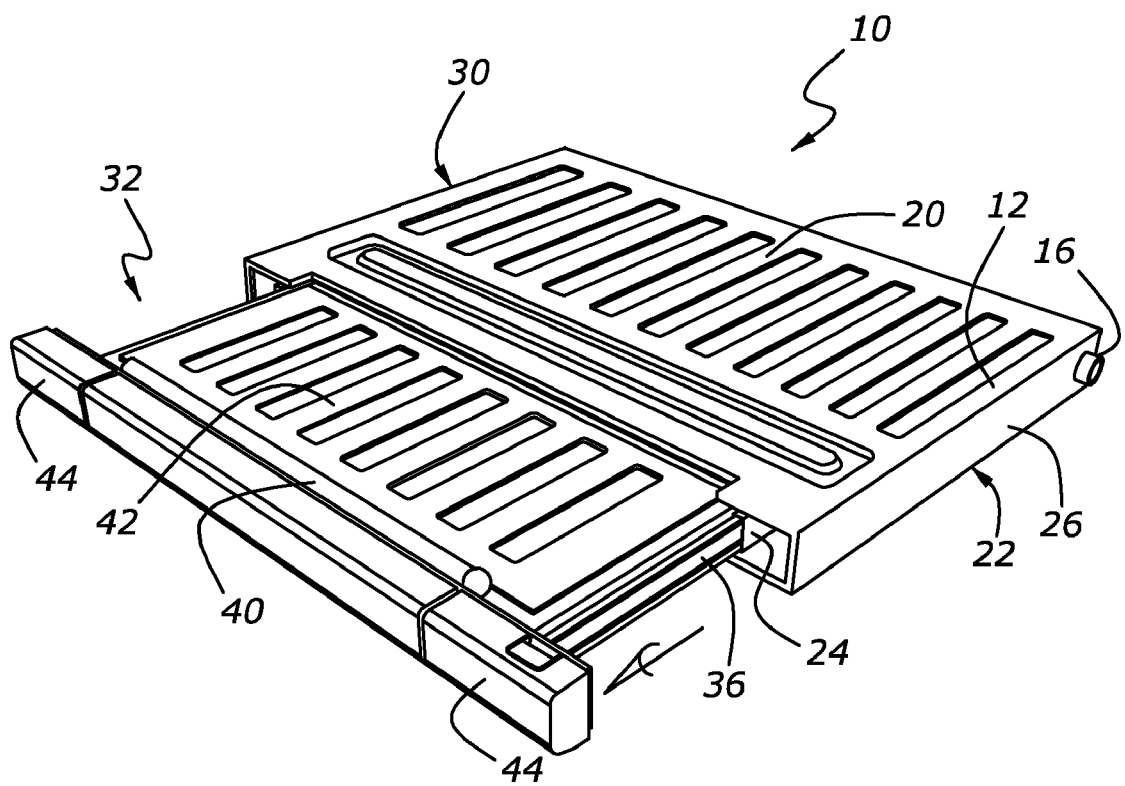
FIG. 5 is an isometric view of the tailgate and bed extender of FIG. 1, illustrating the tailgate and bed extender disposed in a deployed configuration.

Once bed extender assembly 32 has been deployed to the desired distance, cargo restraining panel 42 may now be engaged by rotating the panel from the horizontal closed position as shown in FIGS. 4-6 to the generally vertical engaged position illustrated in FIG. 7. When the cargo restraining panel approaches the vertical position, the locking mechanism engages securing the cargo restraining panel in the vertical position. Oversized materials may now be loaded into the cargo bed of the pick-up truck in the gap between the vehicle's side panels and the vertical cargo restraining panel. Once the oversized materials have been loaded into the cargo bed of the truck, the user may apply a force against the extender molding or step molding in a direction towards the horizontal tailgate frame to retract the bed extender assembly into the tailgate frame until the protruding ends of the oversize materials engage the cargo restraining panel. At this point of engagement, the materials prevent further retraction of the bed extender assembly into the tailgate frame, and ratcheting mechanism 52 coupling the bed extender assembly with the tailgate frame prevents the tailgate assembly from significant further retraction out of the tailgate frame. Thus, the cargo restraining panel acts as a clamp restraining the oversized materials within the cargo bed and preventing substantial motion during the turning, braking, and acceleration of the vehicle.

When the user reaches the intended destination, the aforementioned process may be reversed to offload the materials and retract the bed extender assembly. Specifically, the release latch may be triggered and the bed extender assembly may be further retracted from the tailgate frame. The materials may be offloaded between the gap created by the cargo restraining panel and the side panels of the vehicle. When all materials are offloaded, the cargo restraining panel may be rotated back to the horizontal closed position illustrated in FIGS. 5-6 and the bed extender assembly may be pushed back into the fully retracted position of FIG. 4 by applying a force on the bed extender assembly that may be directed towards the horizontal tailgate frame.

Alternatively, the user may deploy the step assembly and mounting assist arm while the materials are still clamped by the cargo restraining panel to assist in accessing and offloading the materials from the vehicle's storage area. Specifically, the user may first pull mounting assist arm 40 out of its storage position indicated in FIGS. 4-5 and rotate the mounting assist arm counter-clockwise relative to the user until the mounting assist arm locks into the substantially vertical position indicated in FIGS. 6-7. A user may then grip the step molding and pull the step assembly toward the user until the step assembly is fully extended. The user may then allow the step assembly to pivot under gravity until the step assembly rests in the fully deployed position shown in FIGS. 6-7. The user may be then able to grasp the mounting assist arm with the user's left hand and place the user's right foot onto the step cross member, using the step cross member as a step to assist the user in boarding the cargo area of the truck. The user would then be able to step on an extender support member or the extender cross member while maintaining balance and support by continuing to grasp the mounting assist arm. The user may then step onto the tailgate inner panel and enter the storage area of the vehicle.

The step assembly and mounting assist arm may also be deployed in the manner described above when the bed extender assembly is in the fully retracted position.

Although particular embodiments of the have been described in detail herein with reference to the accompanying drawings, it is to be understood that the invention is not limited to those particular embodiments, and that various changes and modifications may be affected therein by one skilled in the art without departing from the scope or spirit of the invention as defined in the appended claims.

What is claimed is:

1. A vehicle tailgate extender mechanism comprising:
a tailgate frame including at least one tailgate bed extender guide;
a bed extender assembly coupled to the tailgate frame and including at least one extender cross member, at least one extender guide secured to said extender cross member, and at least one extender support member secured to said extender cross member, said extender support member capable of at least partially extending out of and retracting into said tailgate bed extender guide; and
a step assembly coupled to said bed extender assembly and including at least one step cross member secured to at least one step support member capable of at least partially retracting into and extending out of said extender guide, said step support member also capable of pivoting about a hinge adjacent a distal end of said extender guide when said step support member is in a substantially extended position.

2. A vehicle tailgate extender mechanism according to claim 1, further comprising a mounting assist arm rotatably coupled to said extender cross member.

3. A vehicle tailgate extender mechanism according to claim 1, wherein said extender support member has a rectangular cross-sectional shape.

4. A vehicle tailgate extender mechanism according to claim 1, further comprising a cargo restraining panel rotatably coupled to said extender cross member.

5. A vehicle tailgate extender mechanism according to claim 1, further comprising a ratcheting mechanism coupling said extender support member to the tailgate frame and allowing said extender support member to be linearly displaced in a first direction within said tailgate bed extender guide while simultaneously preventing substantial linear movement of said extender support member in a second direction opposite said first direction within said tailgate bed extender guide.

6. A vehicle tailgate extender mechanism according to claim 5, wherein said ratcheting mechanism includes a linear pawl engageable with a surface of a ratchet tooth, said ratchet tooth being integrated into an engagement rack coupled to the tailgate frame.

7. A vehicle tailgate extender mechanism according to claim 6, wherein said ratcheting mechanism includes a release mechanism that at least partially retracts said linear pawl into an interior of said extender support member when said release mechanism is engaged.

8. A vehicle tailgate extender mechanism according to claim 7, wherein said release mechanism is engaged by pivoting a release latch disposed on said extender cross member.

* * * * *